US010781365B2

(12) United States Patent
Chen

(10) Patent No.: US 10,781,365 B2
(45) Date of Patent: Sep. 22, 2020

(54) COMBINATION SOLUTION OF COLLOIDAL QUANTUM DOTS AND METHOD FOR MAKING THE SAME

(71) Applicant: National Tsing Hua University, Hsinchu (TW)

(72) Inventor: Hsueh-Shih Chen, Hsinchu (TW)

(73) Assignee: NATIONAL TSING HUA UNIVERSITY, Hsinchu (TW)

(*) Notice: Subject to any disclaimer, the term of this patent is extended or adjusted under 35 U.S.C. 154(b) by 360 days.

(21) Appl. No.: 15/799,459

(22) Filed: Oct. 31, 2017

(65) Prior Publication Data
US 2018/0312749 A1 Nov. 1, 2018

(30) Foreign Application Priority Data

Apr. 26, 2017 (TW) .............................. 106113902 A

(51) Int. Cl.
C09K 11/02 (2006.01)
C09K 11/56 (2006.01)
C09K 11/62 (2006.01)
C09K 11/64 (2006.01)
C09K 11/70 (2006.01)
C09K 11/88 (2006.01)
B82Y 20/00 (2011.01)
B82Y 40/00 (2011.01)

(52) U.S. Cl.
CPC .......... C09K 11/025 (2013.01); C09K 11/565 (2013.01); C09K 11/62 (2013.01); C09K 11/64 (2013.01); C09K 11/70 (2013.01); C09K 11/706 (2013.01); C09K 11/883 (2013.01); B82Y 20/00 (2013.01); B82Y 40/00 (2013.01); Y10S 977/774 (2013.01); Y10S 977/779 (2013.01); Y10S 977/78 (2013.01); Y10S 977/783 (2013.01); Y10S 977/815 (2013.01); Y10S 977/824 (2013.01); Y10S 977/835 (2013.01); Y10S 977/892 (2013.01); Y10S 977/95 (2013.01)

(58) Field of Classification Search
CPC .................................................... C09K 11/025
See application file for complete search history.

(56) References Cited

U.S. PATENT DOCUMENTS 8,921,827 B2 * 12/2014 Pickett .................. B82Y 15/00
257/13
9,257,600 B2 * 2/2016 Tang .................. H01L 33/0083

* cited by examiner

Primary Examiner — C. Melissa Koslow
(74) Attorney, Agent, or Firm — Anova Law Group, PLLC

(57) ABSTRACT

Differing from commercial solution of colloidal quantum dots being often composed of a non-polar organic solvent and a plurality of quantum dots, the present invention discloses a combination solution of colloidal quantum dots comprising a liquid monomer with low glass transition temperature and a plurality of quantum dot units, wherein the quantum dot unit comprises a polar carrier particle, a plurality of quantum dots and an enclosure layer with high glass transition temperature. It is worth explaining that, after applying an aging treatment to the combination solution of colloidal quantum dots and the commercial solution of colloidal quantum dots for 200 minutes, measurement data of UV-VIS spectrophotometer have proved that the combination solution of colloidal quantum dots provided by the present invention is 1.6 times as stable as the commercial solution of colloidal quantum dots.

16 Claims, 7 Drawing Sheets

COMBINATION SOLUTION OF COLLOIDAL QUANTUM DOTS AND METHOD FOR MAKING THE SAME

BACKGROUND OF THE INVENTION

1. Field of the Invention

The present invention relates to the technology field of quantum dots, and more particularly to a combination solution of colloidal quantum dots and a method for making the same.

2. Description of the Prior Art

Quantum dots (QDs) are nanometer-scale semiconductor crystallites composed of elements from groups III-V or II-VI listed in the periodic table. In 1993, Bawendi and his coworkers synthesized better luminescent CdSe QDs by using a high temperature organometallic procedure called colloidal method. Moreover, Bawendi Group also saw fluorescent light with different colors of blue, green and red while the size of the synthesized CdSe QDs is controlled at 2.1 nm, 2.6 nm and 4.5 nm, respectively.

Follow-up researches reported that, the electronic states of CdSe QDs are sensitive to the overall cluster shape, and more specifically to the deformations due to surface reconstruction and the presence of defects. The reason is that these colloidal nanoparticles contain a large number of defects, especially at the surface, where radiationless recombination of the charge carriers can occur. On the other hand, some molecules of water and oxygen may diffuse through these surface defects; as a result, both stability and performance of CdSe QDs are obviously reduced. Accordingly, in order to improve the stability of CdSe QDs and reduce the surface defects thereof, Hines and his team developed a core/shell-structured quantum dot by capping the surface of CdSe core particle with a ZnS shell layer. It is worth noting that, experimental results have proved that the fluorescence quantum efficiency of the CdSe/ZnS core/shell QDs is greater than the traditional CdSe QDs' by 6 times. Besides the aforesaid core/shell-structured quantum dot, various alloyed semiconductor quantum dots such as $Cd_{1-x}Zn_xSe$ or $Cd_{1-x}Zn_{1-x}Se$ have been developed and proposed today.

Thus, conjugation of hydrophobic and/or amphiphilic shells/molecules on the surface of CdSe QDs synthesized in organic phases continues to be attractive. Typical examples of the conversion of CdSe QDs from organic-to-aqueous phase involve the exchange of hydrophobic ligands with trioctylphosphine (TOP), oleic acid (OA) or octadecylamine After bonding at least one hydrophobic ligand to the surface of the CdSe QDs, the surface-modified CdSe QDs 11' would be further dissolved by a non-polar solvent 12' like toluene or hexane in a storage bottle 2' shown as FIG. 1, such that a solution of colloidal quantum dots is obtained. However, according to the data curve graph of Aging Time versus Intensity provided in FIG. 2, it is easy to find that the luminous intensity of the surface-modified CdSe QDs 11' stored in the storage bottle 2' is gradually rolling off with the increase of aging Time.

Thus, in spite of QDs manufacturer storing the surface-modified CdSe QDs by using the non-polar solvent and the storage bottle, it is able to know that such storage way cannot guarantee the long-term stability of surface-modified CdSe QDs. Accordingly, for improving the stability of the surface-modified CdSe QDs, the inventors of the present application have made great efforts to make inventive research thereon and eventually provided a combination solution of colloidal quantum dots and a method for making the same.

SUMMARY OF THE INVENTION

The primary objective of the present invention is to provide a combination solution of colloidal quantum dots and a method for producing the combination solution. Differing from commercial solution of colloidal quantum dots being often composed of a non-polar organic solvent and a plurality of quantum dots, the present invention discloses a combination solution of colloidal quantum dots comprising a liquid monomer with low glass transition temperature and a plurality of quantum dot units, wherein the quantum dot unit comprises a polar carrier particle, a plurality of quantum dots and an enclosure layer with high glass transition temperature. It is worth explaining that, after applying an aging treatment to the combination solution of colloidal quantum dots and the commercial solution of colloidal quantum dots for 200 minutes, measurement data of UV-VIS spectrophotometer have proved that the combination solution of colloidal quantum dots provided by the present invention is 1.6 times as stable as the commercial solution of colloidal quantum dots.

In order to achieve the primary objective of the present invention, the inventor of the present invention provides one embodiment for the combination solution of colloidal quantum dots, which is comprises:

a liquid monomer with a first glass transition temperature; and a plurality of quantum dot units, being dispersed in the liquid monomer, and each of the quantum dot units comprising:
 a polar carrier particle;
 a plurality of quantum dots, being attached on the surface of the polar carrier particle; and
 an enclosure layer, being made of an acrylate ester material with a second glass transition temperature that is higher than the first glass transition temperature of the liquid monomer, and used for encapsulating the polar carrier particle and the quantum dots.

In the embodiment of the combination solution of colloidal quantum dots further comprises a plurality of hydrophilic nanoscale particles dispersed in the liquid monomer, and the manufacturing material of the hydrophilic nanoscale particle is selected from the group consisting of silica ($SiO_2$), titania ($TiO_2$), copolymers of maleic anhydride and methyl vinyl ether, polyvinyl pyrrolidone (PVP), and polyacrylate.

In the embodiment of the combination solution of colloidal quantum dots, the viscosity of the combination solution is adjusted to be greater than 50,000 cp.

In the embodiment of the combination solution of colloidal quantum dots, the manufacturing material of the liquid monomer is selected from the group consisting of ethyl acrylate, butyl acrylate, n-butyl acrylate, and iso-octyl acrylate.

In the embodiment of the combination solution of colloidal quantum dots, the manufacturing material of the polar carrier particle is selected from the group consisting of silica ($SiO_2$) and polymethylmethacrylate (PMMA).

In the embodiment of the combination solution of colloidal quantum dots, the acrylate ester material with the second_high glass transition temperature is selected from the group consisting of methyl methacrylate, ethyl methacrylate, n-butyl methacrylate, iso-octyl methacrylate, iso-bornyl methacrylate, and acrylic acid-vinyl acetate.

Moreover, for achieving the primary objective of the present invention, the inventor of the present invention provides one embodiment for the method for producing the said combination solution of colloidal quantum dots, wherein the method comprises following steps:

(1) dispersing a plurality of polar carrier particles in a polar solvent, and then adding a first surface modifying agent into the polar solvent, so as to treat the polar carrier particles with a first surface modification process; wherein the first surface modifying agent is a coupling agent or a hydrophilic polymer;

(2) dispersing a plurality of quantum dots into a non-polar solvent, and then adding a second surface modifying agent into the non-polar solvent, so as to treat the quantum dots with a second surface modification process; wherein the second surface modifying agent is a alkoxysilane material;

(3) mixing the polar carrier particles been surface modified obtained from the step (1) with the quantum dots been surface modified obtained from the step (2) for making the quantum dots be attached onto the surface of the polar carrier particles;

(4) forming at least one enclosure layer made of an acrylate ester material, and then obtaining a plurality of quantum dot units; wherein each of the polar carrier particles and the quantum dots attached thereon is encapsulated by the enclosure layer;

(5) dispersing the quantum dot units in a liquid monomer, therefore the said combination solution of colloidal quantum dots is obtained; wherein the liquid monomer has a first glass transition temperature, and the acrylate ester material having a second glass transition temperature that is relatively higher than the first glass transition temperature of the liquid monomer.

In the embodiment of the method for producing the combination solution of colloidal quantum dots, the liquid monomer is also dispersed with a plurality of hydrophilic nanoscale particles.

In the embodiment of the method for producing the combination solution of colloidal quantum dots, the coupling agent selected from the group consisting of tetramethyl orthosilicate (TMOS), tetraethyl orthosilicate (TEOS), and 3-aminopropyl-triethoxysilane (APTES).

In the embodiment of the method for producing the combination solution of colloidal quantum dots, the hydrophilic polymer selected from the group consisting of polyethylenimine (PEI), polyethylene glycol (PEG), and combination of aforesaid two materials.

In the embodiment of the method for producing the combination solution of colloidal quantum dots, the second surface modifying agent is an alkoxysilane material selected from the group consisting of 3-mercaptopropyltrimethoxysilane (3-MPS), 3-aminopropyltriethoxysilane (APTMS), 3-(trimethoxysilyl) propylmethacrylate (TMOPMA), 3-trimethoxysilylpropanethiol (MPTMS), and aminopropyltriethoxysilane (APS).

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a combination solution of colloidal quantum dots and a method for making the combination solution, embodiments of the present invention will be described in detail with reference to the attached drawings hereinafter.

First Embodiment

Figure 1:
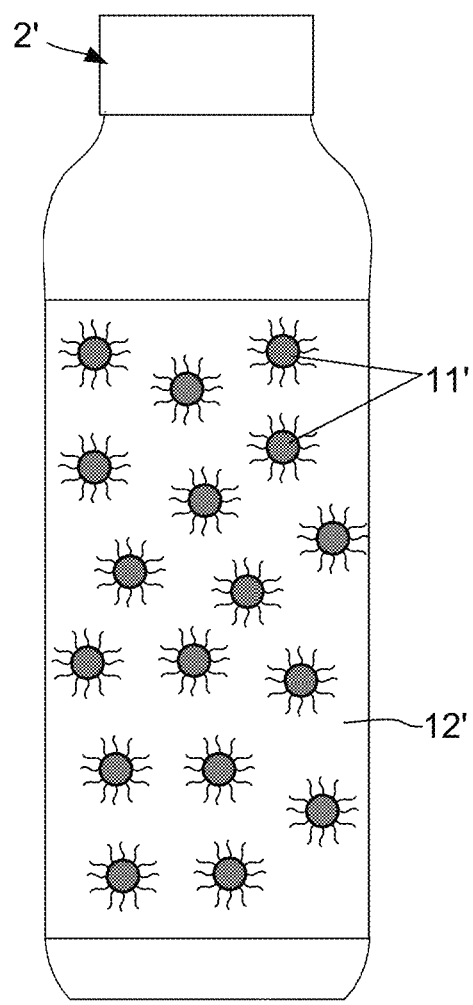
FIG. 1 shows a diagram of a storage bottle storing with surface-modified CdSe QDs dissolved by a non-polar solvent.
Figure 2:
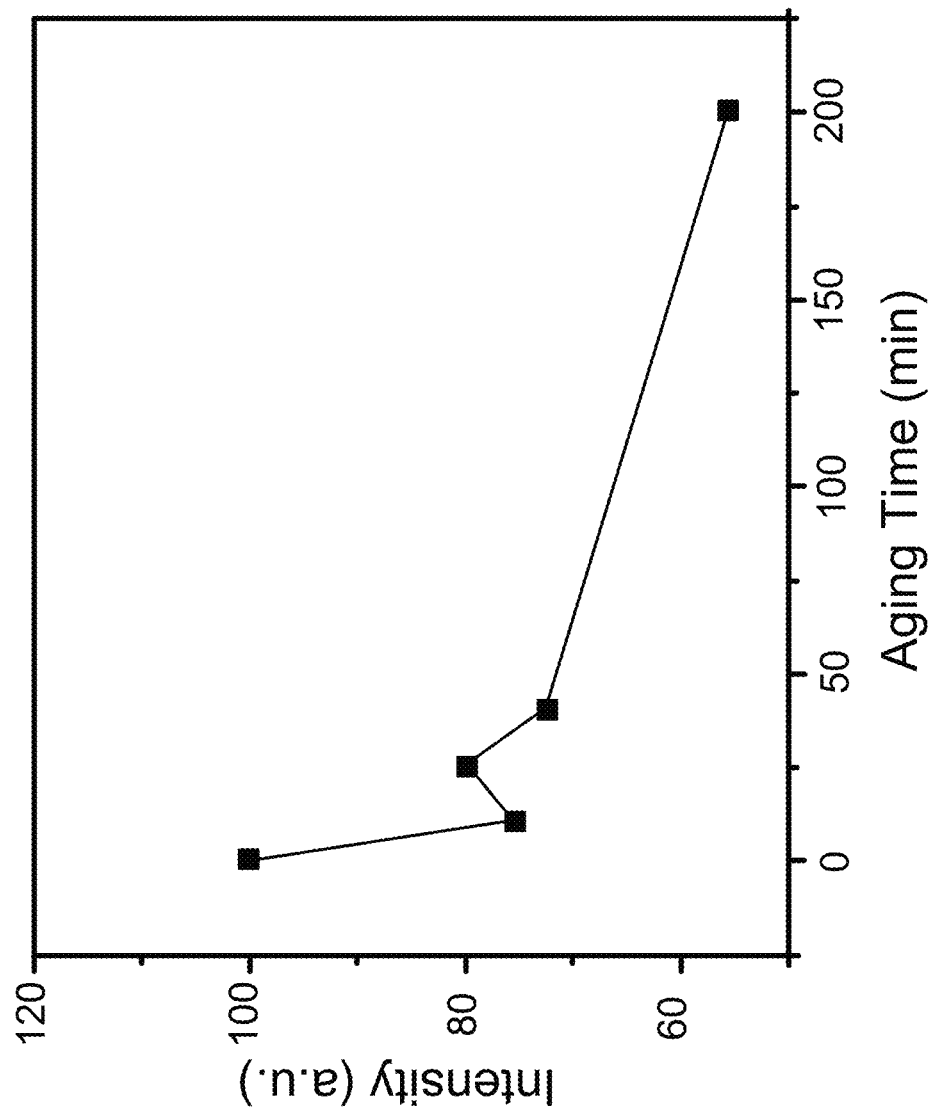
FIG. 2 shows a data curve graph of Aging Time versus Intensity.
Figure 3:
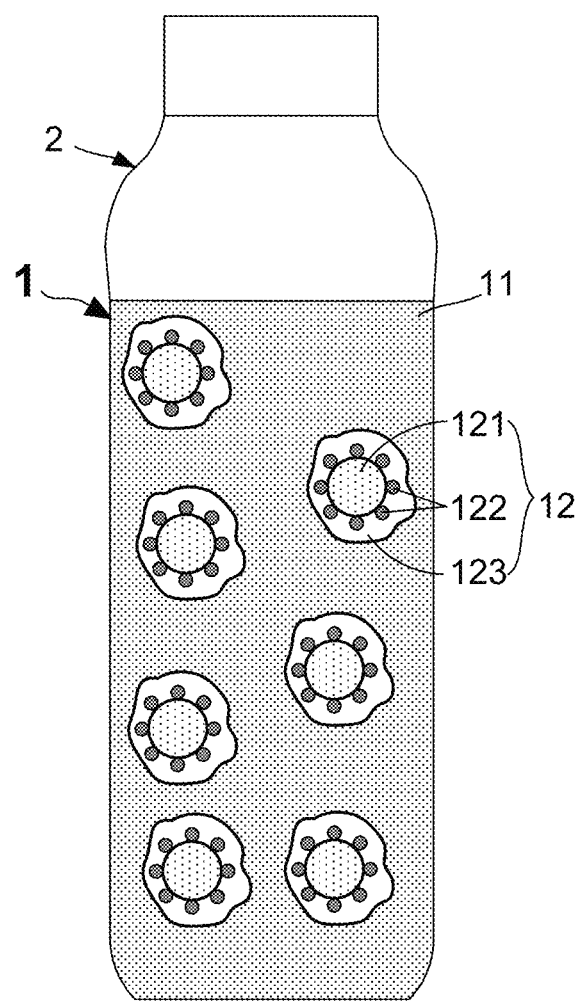
FIG. 3 shows a schematic diagram of a first embodiment for a combination solution of colloidal quantum dots according to the present invention.

With reference to FIG. 3, there is a schematic diagram of a first embodiment for a combination solution of colloidal quantum dots according to the present invention. As FIG. 3 shows, the combination solution 1 of colloidal quantum dots is stored in a storage bottle 2, and mainly comprises a liquid monomer 11 with a first glass transition temperature and a plurality of quantum dot units 12 dispersed in the liquid monomer 11. In the first embodiment of the combination solution 1, the manufacturing material of the liquid monomer can be ethyl acrylate, butyl acrylate, n-butyl acrylate, or iso-octyl acrylate.

It is worth explaining that, the present invention particularly make the quantum dot unit 12 consist of a polar carrier particle 121, a plurality of quantum dots 122 and an enclosure layer 123, wherein the manufacturing material of the polar carrier particle 121 can be silica (SiO2) or polymethylmethacrylate (PMMA). Moreover, in the present invention, a light converter is constituted by the polar carrier particle 121 and the QDs 122 attached on the surface thereof. The QDs 122 is formed by Group II-VI compounds, Group III-V compounds, Group II-VI compounds having core-shell structure, Group III-V compounds having core-shell structure, Group II-VI compounds having non-spherical alloy structure, or combination of the aforesaid two or above compounds. Moreover, different exemplary materials for the QDs 122 are listed in following Table (1).

TABLE (1)

| Compounds | Exemplary materials |
| --- | --- |
| Group II-VI compounds | CdSe or CdS |
| Group III-V compounds | (Al, In, Ga)P, (Al, In, Ga)As, or (Al, In, Ga)N |
| Group III-V compounds having core-shell structure | CdSe/ZnS core-shell QD |
| Group III-V compounds having core-shell structure | InP/ZnS core-shell QD |
| Group II-VI compounds having non-spherical alloy structure | ZnCdSeS |

In spite of the materials of the QDs 122 are listed in Table (1), that does not used for approaching a limitation in use of the manufacturing materials of the QDs 122. On the other hand, engineers skilled in development and manufacture of quantum dots should know that, color modulation of QD photoluminescence can be achieved by controlling the size of the synthesized QDs 122 designedly. The colors of a photoluminescent light emitted by the QDs corresponding to different QD sizes are integrated in following Table (2).

TABLE (2)

| Colors of photoluminescent light | Size of QD (nm) |
|---|---|
| Blue-green | 2-7 |
| Green | 3-10 |
| Yellow | 4-12 |
| Orange | 4-14 |
| Red | 5-20 |

Moreover, as FIG. 3 shows, the enclosure layer 123 is made of an acrylate ester material with a second glass transition temperature that is lower than the first glass transition temperature of the liquid monomer. The enclosure layer 123 is used for encapsulating the polar carrier particle 121 and the quantum dots 122, wherein the said ester material can be methyl methacrylate, ethyl methacrylate, n-butyl methacrylate, iso-octyl methacrylate, iso-bornyl methacrylate, styrene/acrylic acid ester, or acrylic acid-vinyl acetate.

Manufacturing Method of the First Embodiment

Above descriptions have fully introduced the combination solution of colloidal quantum dots proposed by the present invention. Next, a method for producing the said combination solution of colloidal quantum dots will be introduced as follows. Please refer to FIG. 4, where a flow chart of a method for producing the said combination solution of colloidal quantum dots according to the present invention is provided. Moreover, FIG. 5 shows a schematic diagram of manufacturing processes of the combination solution of colloidal quantum dots. The method for producing the combination solution of colloidal quantum dots comprises following steps:

(S1) dispersing a plurality of polar carrier particles 121 in a polar solvent, and then adding a first surface modifying agent into the polar solvent, so as to treat the polar carrier particles 121 with a first surface modification process; wherein the said first surface modifying agent is a coupling agent or a hydrophilic polymer;

(S2) dispersing a plurality of quantum dots 122 into a non-polar solvent, and then adding a second surface modifying agent into the non-polar solvent, so as to treat the quantum dots 122 with a second surface modification process; wherein the said second surface modifying agent is an alkoxysilane material;

(S3) mixing the polar carrier particles 121 been surface modified obtained from the step (S1) with the quantum dots 122 been surface modified obtained from the step (S2) for making the quantum dots 122 be attached onto the surface of the polar carrier particles 121;

(S4) forming at least one enclosure layer 123 made of an acrylate ester material obtaining a plurality of quantum dot units 12; wherein each of the polar carrier particles and the quantum dots attached thereon is encapsulated by the enclosure layer; and (S5) dispersing the quantum dot units 12 in a liquid monomer 11, therefore the said combination solution 1 of colloidal quantum dots is obtained; wherein the liquid monomer 11 has a first glass transition temperature, and the acrylate ester material having a second glass transition temperature that is relatively higher than the first glass transition temperature of the liquid monomer 11.

It is noted that the determination of using the coupling agent or the hydrophilic polymer to be the first surface modifying agent is dependent on what material of the polar carrier particle 121 is. Corresponding materials for the first surface modifying agent and the polar carrier particle 121 are listed in following Table (3).

TABLE (3)

| Materials of polar carrier particle | Corresponding materials for first surface modifying agent |
|---|---|
| Silica (SiO$_2$) | Coupling agent, such as tetramethyl orthosilicate (TMOS), tetraethyl orthosilicate (TEOS), or 3-aminopropyl triethoxysilane (APTES) |
| Polymethylmethacrylate (PMMA) | Hydrophilic polymer, like polyethylenimine (PEI), polyethylene glycol (PEG), or combination of PEI and PEG |

On the other hand, the polar solvent used in the step (S1) can be methanol, ethanol or other organic polar solvents, and the non-polar solvent used in the step (S2) can be hexane, toluene, CHCl$_3$, or other organic non-polar solvents. Differing from the first surface modifying agent, the said second surface modifying agent used in the step (S2) is an alkoxysilane material, such as 3-mercaptopropyltrimethoxysilane (3-MPS), 3-aminopropyltriethoxysilane (APTMS), 3-(trimethoxysilyl) propylmethacrylate (TMOPMA), 3-trimethoxysilylpropanethiol (MPTMS), or aminopropyltriethoxysilane (APS).

Figure 4:
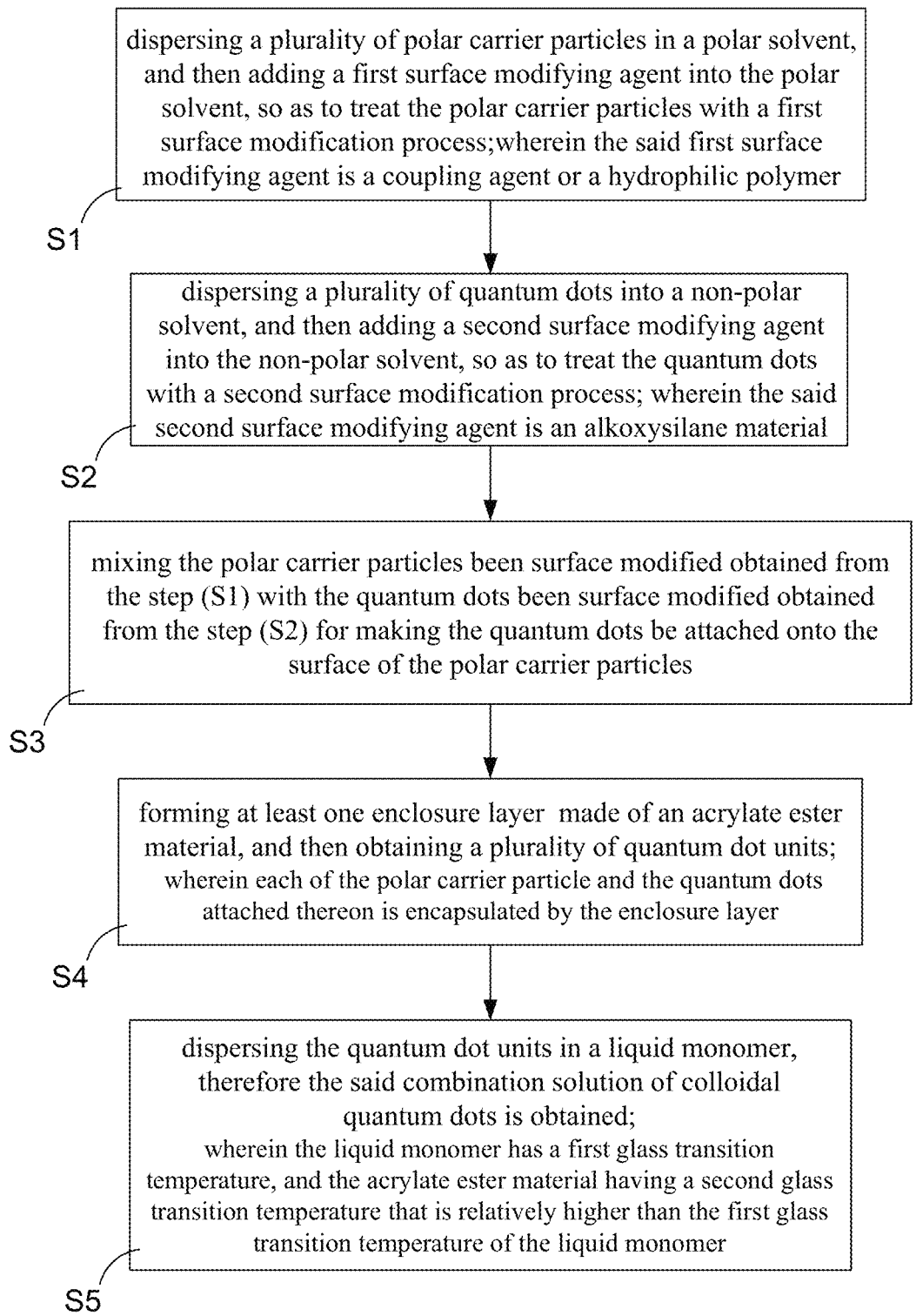
FIG. 4 shows a flow chart of a method for producing the said combination solution of colloidal quantum dots according to the present invention.
Figure 5:
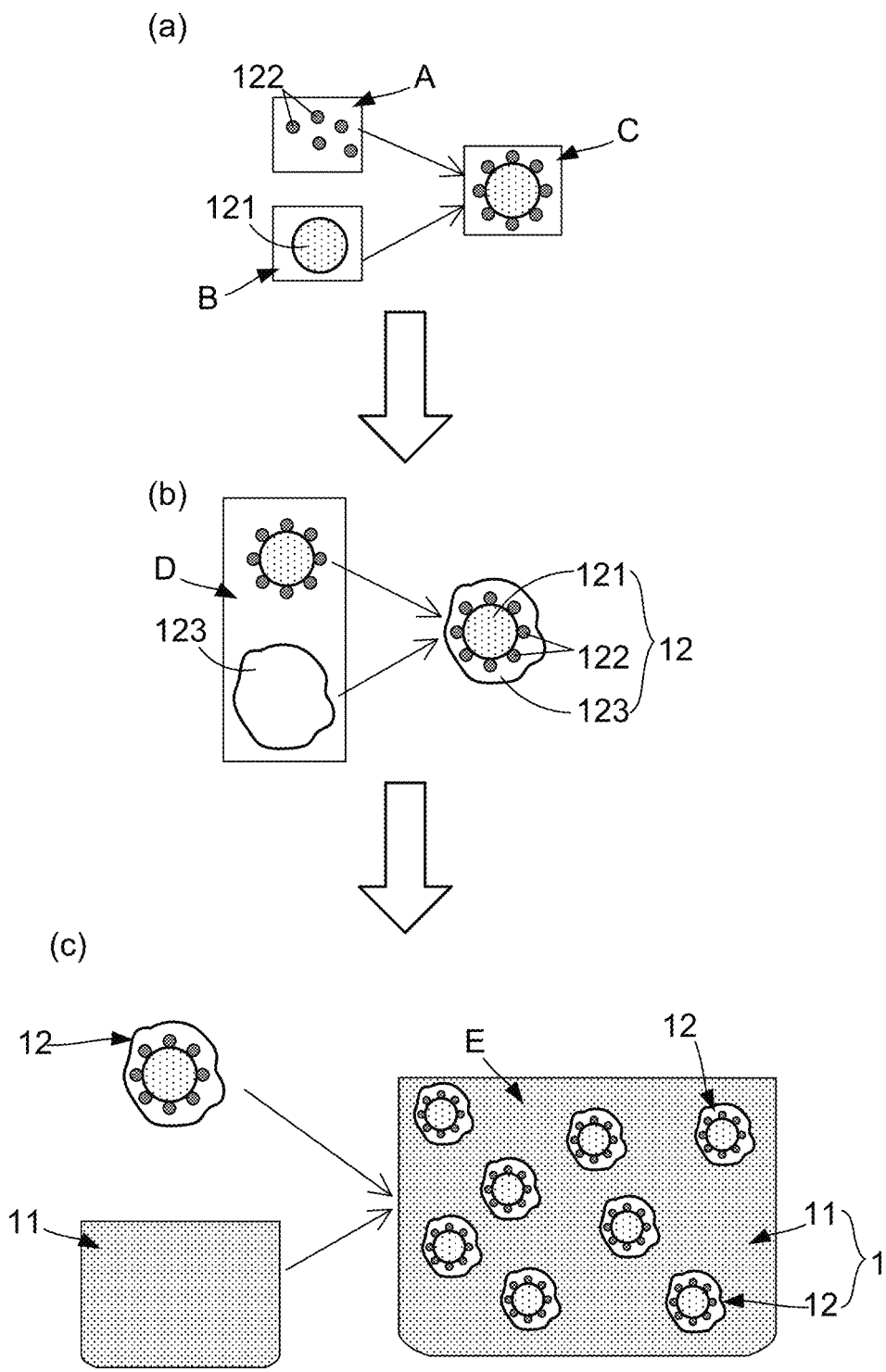
FIG. 5 shows a schematic diagram of manufacturing processes of the combination solution of colloidal quantum dots.

According to FIG. 4 and diagram (a) shown in FIG. 5, it is able to know that the products obtained from the step (S1) and the step (S2) are a first solution A and a second solution B, respectively. Moreover, a mixture of the first solution A and the second solution B is a third solution C. Furthermore, as diagram (b) of FIG. 5 shows, it is subsequently adding acrylate monomers, an initiator agent and a crosslink agent into the third solution C, such that a fourth solution D is hence obtained. Therefore, after applying the fourth solution D with an ultrasonic vibration treatment and a centrifugal process in turns, a precipitate of the quantum dot units is produced in the solution D.

Herein, it needs to explain that the said initiator agent can be 2,2'-azobis(2-methylpropionitrile) (AIBN) or diphenylperoxyanhydride (BPO), and the said crosslink agent can be trimethylolpropane triacrylate (TMPTMA), 1,3,5-tri-2-propenyl-1,3,5-triazine-2,4,6(1H,3H,5H)-trione (TAIC), tri (propylene glycol) diacrylate (TPGDA), pentaerythritol triacrylate (PETA), hexamethylene diacrylate (HDDA), or anilinoacetic acid.

Eventually, as diagram (c) of FIG. 5 shows, a five solution E can be produced by dispersing the obtained quantum dot units 12 in a liquid monomer 11 with low glass transition temperature, wherein the five solution E is the said combination solution 1 of colloidal quantum dots proposed by the present invention. It is worth explaining that, after obtaining the combination solution 1, a photo-initiator agent and a tackifying agent can be used to adjust the viscosity of the combination solution 1 to be greater than 50,000 cp. In the present invention, the photo-initiator agent is 4-Methoxyphenylacetone, 9-phenylacridine, or anilinoacetic acid, and the tackifying agent can be polyacrylate, alkyl acrylate copolymer, or hydroxyalkyl methacrylate.

Second Embodiment

Figure 6:
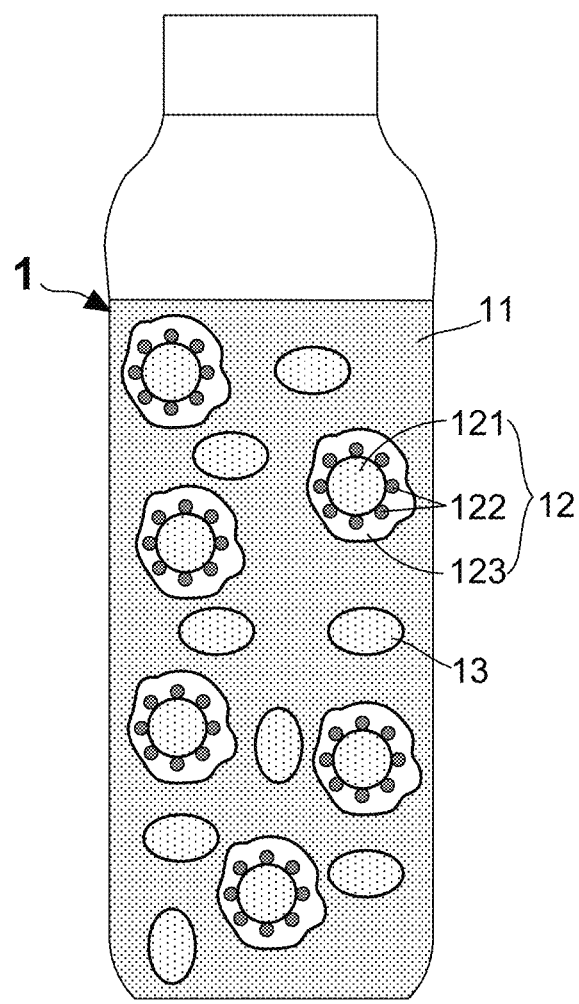
FIG. 6 shows a schematic diagram of a second embodiment for the combination solution of colloidal quantum dots according to the present invention.

With reference to FIG. 6, there is a schematic diagram of a second embodiment for the combination solution of colloidal quantum dots according to the present invention. According to the second embodiment shown in FIG. 6, the combination solution 1 of colloidal quantum dots is stored in a storage bottle 2, and mainly comprises a liquid monomer 11 with low glass transition temperature, a plurality of quantum dot units 12 and a plurality of hydrophilic nanoscale particles 13, wherein both the quantum dot units 12 and the hydrophilic nanoscale particles 13 are dispersed in the liquid monomer 11. Moreover, the manufacturing material of the hydrophilic nanoscale particle 13 is silica ($SiO_2$), titania ($TiO_2$), copolymer of maleic anhydride and methyl vinyl ether, polyvinyl pyrrolidone (PVP), or polyacrylate.

Stability Testing of the Combination Solution of Colloidal Quantum Dots

Figure 7:
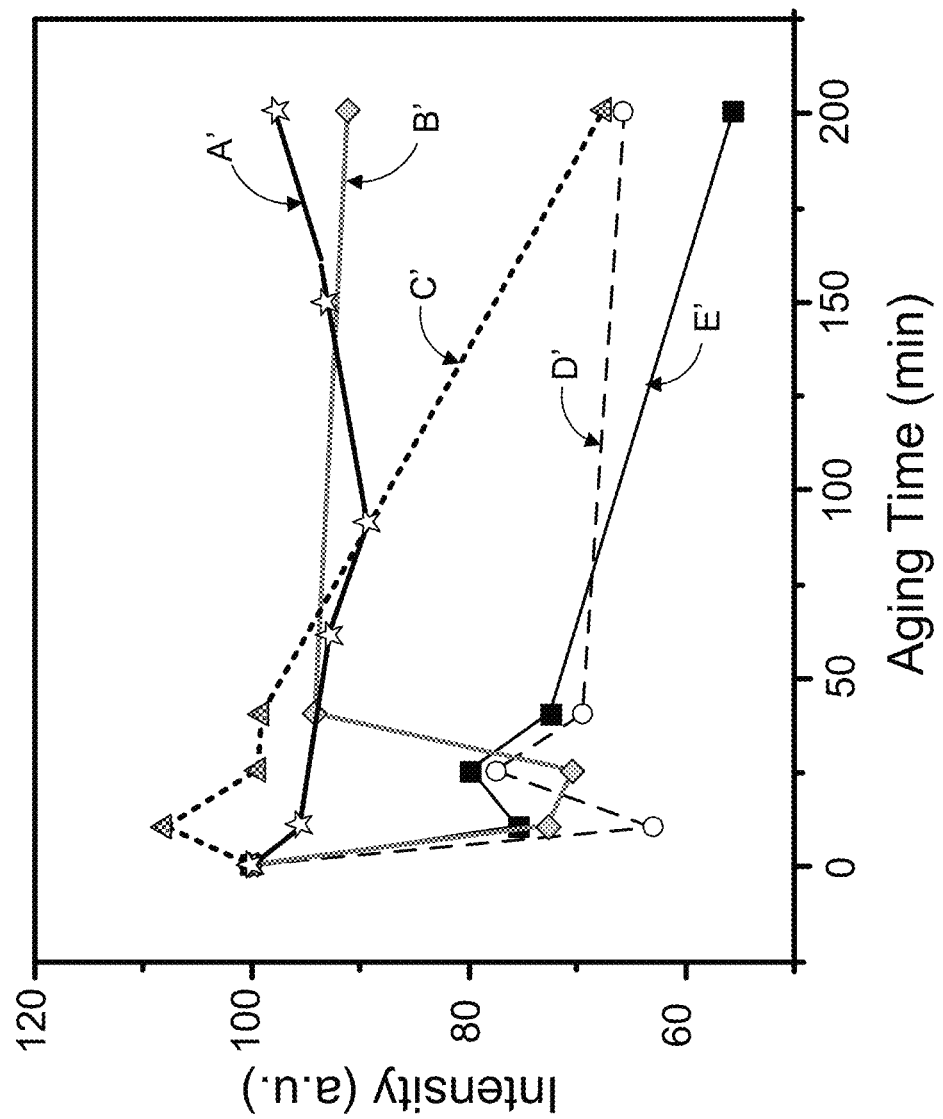
FIG. 7 shows a data curve graph of Aging Time versus Intensity.

In order to verify the stability of the combination solution of colloidal quantum dots proposed by the present invention, different samples of the combination solution of colloidal quantum dots are applied with an aging treatment. Please refer to FIG. 7, which provides a data curve graph of Aging Time versus Intensity. Moreover, information of each of the data curves in FIG. 7 are integrated in following Table (4).

TABLE (4)

| Data curve | Basic information |
|---|---|
| A' | Storing the second embodiment of the said combination solution of colloidal quantum dots in a storing bottle for completing the aging treatment under room temperature, and then measuring the luminous intensity of a fluorescent light emitted from the quantum dot units 12 by being exposed to ultraviolet light. |
| B' | Storing the first embodiment of the said combination solution of colloidal quantum dots in a storing bottle for completing the aging treatment under room temperature, and then measuring the luminous intensity of a fluorescent light emitted from the quantum dot units 12 by being exposed to ultraviolet light. |
| C' | Directly storing a plurality of quantum dots 122 in a liquid monomer 11 with low glass transition temperature for completing the aging treatment under room temperature, and then measuring the luminous intensity of a fluorescent light emitted from the quantum dots 122 by being exposed to ultraviolet light. |
| D' | Directly applying the aging treatment to the quantum dot units 12, and then measuring the luminous intensity of a fluorescent light emitted from the quantum dot units 12 by being exposed to ultraviolet light. |
| E' | Commercial solution of colloidal quantum dots Directly storing a plurality of quantum dots 122 in a non-polar solvent such as toluene for completing the aging treatment under room temperature, and then measuring the luminous intensity of a fluorescent light emitted from the quantum dots 122 by being exposed to ultraviolet light. |

By comparing data curve B with data curve E, it is easy to find that, after completing the 200-minute aging treatment, measurement data of UV-VIS spectrophotometer reveal that the first embodiment of the combination solution of colloidal quantum dots provided by the present invention is 1.6 times as stable as the commercial solution of colloidal quantum dots. Moreover, the measurement data also show that the second embodiment of the combination solution of colloidal quantum dots provided by the present invention is 1.8 times as stable as the commercial solution of colloidal quantum dots.

Therefore, through above descriptions, a combination solution of colloidal quantum dots and a method for making the combination solution of the present invention has been introduced completely and clearly; in summary, the present invention includes the advantages of:

(1) Differing from commercial solution of colloidal quantum dots being often composed of a non-polar organic solvent and a plurality of quantum dots, the present invention discloses a combination solution of colloidal quantum dots comprising a liquid monomer with low glass transition temperature and a plurality of quantum dot units, wherein the quantum dot unit comprises a polar carrier particle, a plurality of quantum dots and an enclosure layer with high glass transition temperature. It is worth explaining that, after applying an aging treatment to the combination solution of colloidal quantum dots and the commercial solution of colloidal quantum dots for 200 minutes, measurement data of UV-VIS spectrophotometer have proved that the combination solution of colloidal quantum dots provided by the present invention is 1.6 times as stable as the commercial solution of colloidal quantum dots.

The above description is made on embodiments of the present invention. However, the embodiments are not intended to limit scope of the present invention, and all equivalent implementations or alterations within the spirit of the present invention still fall within the scope of the present invention.

What is claimed is:

1. A combination solution of colloidal quantum dots, comprising:
    a liquid monomer with a first glass transition temperature; and
    a plurality of quantum dot units, being dispersed in the liquid monomer, and each of the quantum dot units comprising:
        a polar carrier particle;
        a plurality of quantum dots, being attached on the surface of the polar carrier particle; and
        an enclosure layer, being made of an acrylate ester material with a second glass transition temperature that is higher than the first glass transition temperature of the liquid monomer, and used for encapsulating the polar carrier particle and the quantum dots.

2. The combination solution of claim 1, further comprising a plurality of hydrophilic nanoscale particles, being dispersed in the liquid monomer.

3. The combination solution of claim 2, wherein a manufacturing material of the hydrophilic nanoscale particle is selected from the group consisting of silica ($SiO_2$), titania ($TiO_2$), copolymer of maleic anhydride and methyl vinyl ether, polyvinyl pyrrolidone (PVP), and polyacrylate.

4. The combination solution of claim 1, having a viscosity greater than 50,000 cp.

5. The combination solution of claim 1, wherein a manufacturing material of the liquid monomer is selected from the group consisting of ethyl acrylate, butyl acrylate, n-butyl acrylate, and iso-octyl acrylate.

6. The combination solution of claim 1, wherein the quantum dot is selected from the group consisting of Group II-VI compounds, Group III-V compounds, Group II-VI compounds having core-shell structure, Group III-V compounds having core-shell structure, Group II-VI compounds having non-spherical alloy structure, and combination of the aforesaid two or above compounds.

7. The combination solution of claim 1, wherein a manufacturing material of the polar carrier particle is selected from the group consisting of silica ($SiO_2$) and polymethylmethacrylate (PMMA).

8. The combination solution of claim 1, wherein the acrylate ester material is selected from the group consisting of methyl methacrylate, ethyl methacrylate, n-butyl methacrylate, iso-octyl methacrylate, iso-bornyl methacrylate, and acrylic acid-vinyl acetate.

9. A method for producing a combination solution of colloidal quantum dots, comprising following steps:
   (1) dispersing a plurality of polar carrier particles in a polar solvent, and then adding a first surface modifying agent into the polar solvent, so as to treat the polar carrier particles with a first surface modification process; wherein the first surface modifying agent is a coupling agent selected from the group consisting of tetramethyl orthosilicate (TMOS), tetraethyl orthosilicate (TEOS), and 3-aminopropyl-triethoxysilane (APTES), or being a hydrophilic polymer selected from the group consisting of polyethylenimine (PEI) and polyethylene glycol (PEG);
   (2) dispersing a plurality of quantum dots into a non-polar solvent, and then adding a second surface modifying agent into the non-polar solvent, so as to treat the quantum dots with a second surface modification process; wherein the second surface modifying agent is an alkoxysilane material selected from the group consisting of 3-mercaptopropyltrimethoxysilane (3-MPS), 3-aminopropyltriethoxysilane (APTMS), 3-(trimethoxysilyl) propylmethacrylate (TMOPMA), 3-trimethoxysilylpropanethiol (MPTMS), and aminopropyltriethoxysilane (APS);
   (3) mixing the polar carrier particles been surface modified obtained from the step (1) with the quantum dots been surface modified obtained from the step (2) for making the quantum dots be attached onto the surface of the polar carrier particles;
   (4) forming at least one enclosure layer made of an acrylate ester material and then obtaining a plurality of quantum dot units; wherein each of the polar carrier particles and the quantum dots attached thereon is encapsulated by the enclosure layer; and
   (5) dispersing the quantum dot units in a liquid monomer, therefore the said combination solution of colloidal quantum dots is obtained; wherein the liquid monomer has a first glass transition temperature, and the acrylate ester material having a second glass transition temperature that is higher than the first glass transition temperature of the liquid monomer.

10. The method of claim 9, further comprising following step:
   (6) using a photo-initiator agent and a tackifying agent to adjust the viscosity of the combination solution of colloidal quantum dots to be greater than 50,000 cp.

11. The method of claim 10, wherein the photo-initiator agent is selected from the group consisting of 4-Methoxyphenylacetone, 9-phenylacridine, and anilinoacetic acid.

12. The method of claim 10, wherein the tackifying agent is an oligomer selected from the group consisting of polyacrylate, alkyl acrylate copolymer, and hydroxyalkyl methacrylate.

13. The method of claim 9, wherein the liquid monomer is also dispersed with a plurality of hydrophilic nanoscale particles.

14. The method of claim 9, wherein the step (4) comprising following detail steps:
   (41) adding acrylate monomers, an initiator agent and a crosslink agent into the product obtained from the step (3), thereby forming the acrylate ester material for being as the enclosure layer for making each of the polar carrier particles and the quantum dots attached thereon be encapsulated by the enclosure layer; and
   (42) applying the product obtained from the step (41) with an ultrasonic vibration treatment and a centrifugal process in turns, such that a precipitate of the quantum dot units is produced.

15. The method of claim 14, wherein the initiator agent is selected from the group consisting of 2,2'-azobis(2-methylpropionitrile) (AIBN) and diphenylperoxyanhydride (BPO).

16. The method of claim 14, wherein the crosslink agent is selected from the group consisting of trimethylolpropane triacrylate (TMPTMA), 1,3,5-tri-2-propenyl-1,3,5-triazine-2,4,6(1H,3H,5H)-trione (TAIC), tri(propylene glycol) diacrylate (TPGDA), pentaerythritol triacrylate (PETA), hexamethylene diacrylate (HDDA), and anilinoacetic acid.

* * * * *